United States Patent
Erickson et al.

(10) Patent No.: US 6,572,125 B2
(45) Date of Patent: Jun. 3, 2003

(54) RACK AND PINION STEERING ARRANGEMENT FOR A RIDING LAWNMOWER

(75) Inventors: Donald G. Erickson, Antioch, TN (US); Joseph G. Crabtree, Franklin, TN (US)

(73) Assignee: Murray, Inc., Brentwood, TN (US)

( * ) Notice: Subject to any disclaimer, the term of this patent is extended or adjusted under 35 U.S.C. 154(b) by 45 days.

(21) Appl. No.: 09/922,109

(22) Filed: Aug. 3, 2001

(65) Prior Publication Data

US 2002/0017780 A1 Feb. 14, 2002

Related U.S. Application Data

(60) Provisional application No. 60/224,404, filed on Aug. 10, 2000.

(51) Int. Cl.[7] .................................................. B62D 3/12
(52) U.S. Cl. .............................. 280/93.514; 280/93.507
(58) Field of Search ................................. 280/771, 779, 280/93.502, 93.504, 93.505, 93.507, 93.513, 93.514; 74/422, 492, 498, 89.17

(56) References Cited

U.S. PATENT DOCUMENTS

| | | | |
|---|---|---|---|
| 3,298,708 A | 1/1967 | Cadiou | 280/96 |
| 3,887,211 A * | 6/1975 | Mazur | 280/758 |
| 5,099,714 A | 3/1992 | Hutchison et al. | 74/422 |
| 5,238,267 A * | 8/1993 | Hutchison et al. | 280/781 |
| 6,272,946 B1 * | 8/2001 | Roux | 74/498 |

FOREIGN PATENT DOCUMENTS

| | | | | |
|---|---|---|---|---|
| CA | 2161368 A | * | 10/1996 | |
| EP | 0 176 394 | | 4/1986 | B62D/3/12 |
| JP | 7-89447 | * | 4/1995 | |

* cited by examiner

*Primary Examiner*—Paul N. Dickson
*Assistant Examiner*—David R. Dunn
(74) *Attorney, Agent, or Firm*—Kevin E. Joyce

(57) ABSTRACT

A pinion mounted at the lower end of a steering column engages a rack which is supported for movement laterally of the longitudinal axis of a riding lawnmower. Opposite ends of the rack have respective drag links pivotally mounted thereto. Free ends of the drag links are connected to the ends of respective spindle arms, each of which is rotatable about a vertical axis. Each spindle arm supports a ground-engaging wheel. When a steering wheel joined to the steering column is turned, the pinion displaces the rack. The drag links impart pivotal movement to the spindle arms to cause the wheels to turn in the direction the steering wheel has been turned.

3 Claims, 1 Drawing Sheet

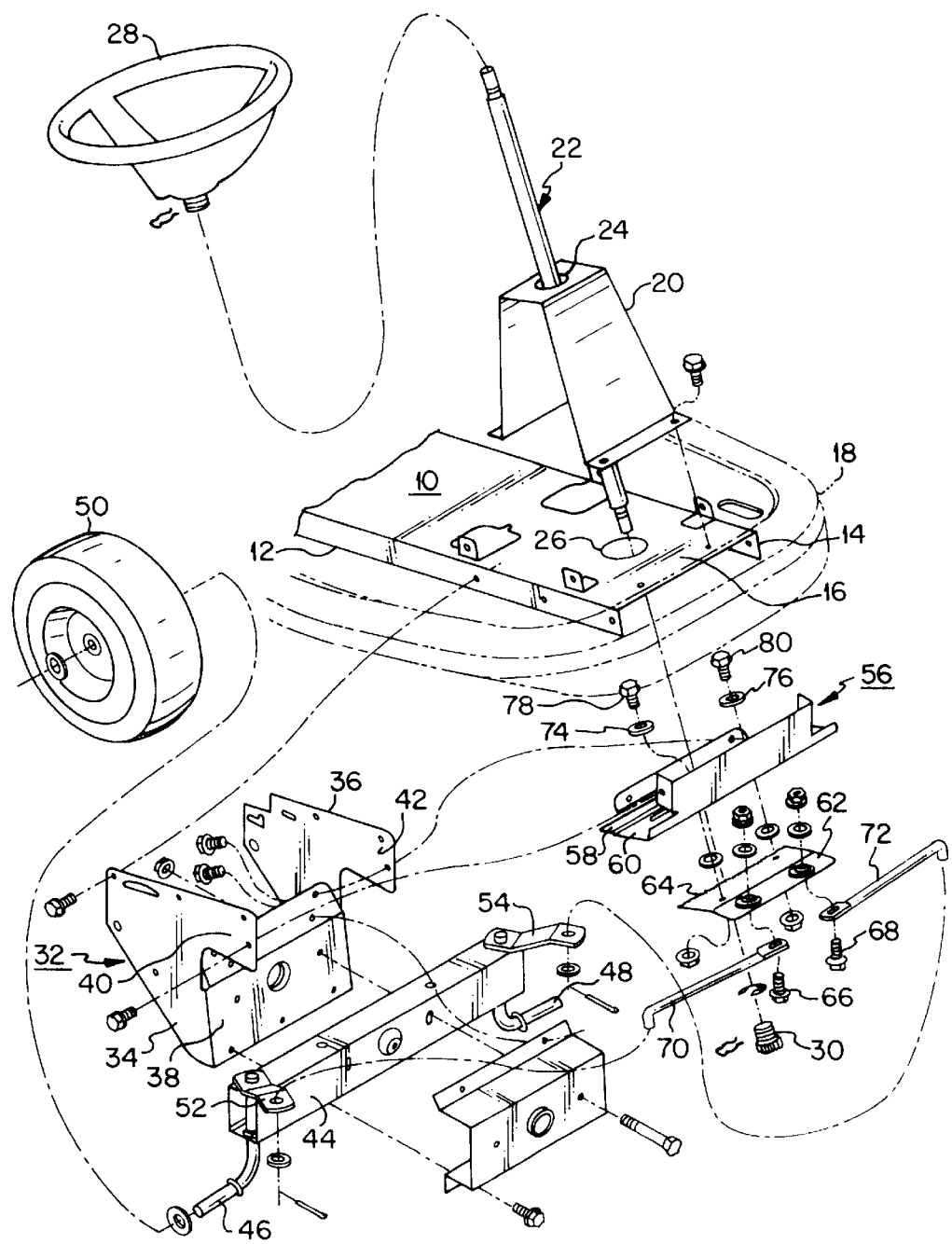

RACK AND PINION STEERING ARRANGEMENT FOR A RIDING LAWNMOWER

This application claims the benefit of U.S. Provisional Application No. 60/224,404, filed Aug. 10, 2000.

BACKGROUND OF THE INVENTION

1. Field of the Invention

The present invention relates to a rack and pinion steering arrangement incorporated in a riding lawnmower to provide a low turning radius for the lawnmower.

2. Prior Art

A frequently used riding lawnmower steering arrangement is one employing a steering plate which is pivotally mounted to the frame of the mower. The plate is displaced by a steering wheel-mounted pinion which engages serrations on a curved edge of the plate. When the pinion is rotated by the steering wheel, the plate is correspondingly pivoted about its mounting. A pair of drag links are pivotally connected to the steering plate. Each drag link is joined to a respective spindle arm which supports a wheel. Thus, when the steering wheel is turned, the pivotal movement of the steering plate is transmitted through the drag links to cause the wheels of the lawnmower to turn.

The present invention improves the turning aspect of a riding lawnmower as compared with the conventional steering arrangement just described.

SUMMARY OF THE INVENTION

A pinion mounted at the lower end of a steering column engages a rack which is supported for movement laterally of the longitudinal axis of a riding lawnmower. Opposite ends of the rack have respective drag links pivotally mounted thereto. Free ends of the drag links are connected to the ends of respective spindle arms, each of which is rotatable about a vertical axis. Each spindle arm supports a ground-engaging wheel. When a steering wheel joined to the steering column is turned, the pinion displaces the rack. The drag links impart pivotal movement to the spindle arms to cause the wheels to turn in the direction the steering wheel has been turned.

BRIEF DESCRIPTION OF THE DRAWING

The invention will be described in greater detail with respect to the accompanying drawing which is an exploded perspective view of the basic components of a rack and pinion steering arrangement for a riding lawnmower.

DETAILED DESCRIPTION OF A PREFERRED EMBODIMENT OF THE INVENTION

Referring to the drawing, a riding lawnmower frame member 10 is illustrated. Member 10 is formed in an inverted U-shape having side walls 12 and 14 joined by a web portion 16. The frame member is positioned along the longitudinal axis of the lawnmower. The main platform 18 of the lawnmower is partially illustrated in phantom lines.

A steering column support member 20 is secured to the top surface of frame member 10. A steering column 22 passes through an opening 24 at the top of member 20 and an opening 26 in frame member 10. Steering wheel 28 is secured to the upper end of steering column 22, and a pinion 30 is joined to the bottom of column 22. Thus, when wheel 28 is turned, the pinion 30 turns in the same direction.

A steering arrangement support member 32 is joined to frame member 10 by being fastened to side walls 12 and 14. Member 32 includes spaced side walls 34 and 36 which lie in vertical planes and a front wall 38 extending between the side walls. Upper portions 40 and 42 of the respective side walls 34 and 36 project forwardly of wall 38.

A box-shaped spindle arm support member 44 is secured to the outer surface of front wall 38. A pair of generally L-shaped spindle arms 46 and 48 are pivotally mounted at opposite ends of member 44. The lower ends of arms 46 and 48 are horizontally disposed, and they project outwardly from member 44 so as to serve as axles for ground-engaging wheels 50 (only one of which is illustrated). The upper ends of arms 46 and 48 have secured thereto connecting links 52 and 54.

A rack supporting member 56 is connected to the side walls 12 and 14 of frame member 10 and to the upper portion of the front wall of the steering arrangement support member 32. Member 56 includes a horizontally disposed lower portion 58 having a channel 60 which is slotted in a direction transverse to the longitudinal axis of frame member 10. A rack 62, having a rear edge 64 formed to cooperate with pinion 30, is joined to the underside of the lower portion 58 of the rack supporting member 56 by fasteners 66 and 68 which pass through openings in the ends of respective drag links 70 and 72, openings in rack 62 and the slot provided in channel 60 of the rack supporting member 56. This joinder is such that rack 62 is free to move in rectilinear fashion along the slot. To facilitate and guide such movement, wheels 74 and 76 are positioned within channel 60 and are joined to rack 62 by fasteners 78 and 80 passing through the wheels 74 and 76 and the slot in channel 60.

The free ends of drag links 70 and 72 are inserted within openings provided in the ends of the connecting links 52 and 54. These connections at the free ends of the drag links 70 and 72 are pivotable. This permits operation of the steering arrangement in the manner now to be described.

When steering wheel 28 is turned, a corresponding rotation of pinion 30 occurs. Since pinion 30 is meshed with edge 64 of rack 62, the rack is laterally displaced along channel 60 of rack supporting member 56 in the direction of the desired turn. Rack 62 carries drag links 70 and 72 in the same direction. As this occurs, the connecting links 52 and 54 are pivoted in the direction of the turn to cause the ground-engaging wheels 50 to correspondingly turn.

With the arrangement just described, the direction of movement of the riding lawnmower can be changed with minimal effort and with a low turning radius.

What is claimed is:

1. A riding lawnmower steering arrangement, comprising:

a lawnmower frame;

a steering column supported by said frame, the steering column being provided with a steering wheel at one of its ends and a pinion at its opposite end;

a member joined to the frame in a fixed position for supporting a rack movable rectilinearly relative to the fixed rack supporting member, said rack being joined to guide elements disposed within a channel formed in said member and extending in a direction transverse to a longitudinal axis of the frame, said rack being positioned in operational relationship with the pinion so as to move in response to rotation of the pinion as a result of turning the steering wheel;

a pair of axles for supporting ground-engaging wheels, said axles being pivotable about substantially vertical axes; and a pair of drag links pivotally connected to opposite ends of the rack and to respective axles whereby when the rack is moved, the axles are pivoted to steer the lawnmower.

2. An arrangement according to claim 1, wherein said guide elements are guide wheels disposed within said channel.

3. An arrangement according to claim 2, wherein said rack is disposed adjacent a surface of the rack supporting member opposite a surface of the member within which the channel is formed, the guide wheels being joined to the rack by connectors passing through a slot in said member which communicates with the channel.

* * * * *